US012801242B2

(12) United States Patent
Guo et al.

(10) Patent No.: US 12,801,242 B2
(45) Date of Patent: Nov. 17, 2026

(54) TOUCH-CONTROL DISPLAY SUBSTRATE AND DRIVING METHOD THEREFOR, DRIVING CIRCUIT, AND DISPLAY DEVICE

(71) Applicants: Beijing BOE Display Technology Co., Ltd., Beijing (CN); BOE Technology Group Co., Ltd., Beijing (CN); Beijing BOE Technology Development Co., Ltd., Beijing (CN)

(72) Inventors: Shuwei Guo, Beijing (CN); Yujie Liu, Beijing (CN); Feng Long, Beijing (CN); Xiuyun Chen, Beijing (CN); Jing Zhao, Beijing (CN); Zixuan Bai, Beijing (CN); Yeyu Feng, Beijing (CN); Chao Huang, Beijing (CN); Dapeng Liang, Beijing (CN); Donghua Wang, Beijing (CN); Xiongxiong You, Beijing (CN); Shuhao Zhao, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 19/154,146

(22) PCT Filed: Jun. 14, 2024

(86) PCT No.: PCT/CN2024/099414
§ 371 (c)(1),
(2) Date: Aug. 6, 2025

(87) PCT Pub. No.: WO2025/025863
PCT Pub. Date: Feb. 6, 2025

(65) Prior Publication Data

US 2026/0236120 A1 Aug. 13, 2026

(30) Foreign Application Priority Data

Jul. 31, 2023 (CN) ........................ 202310952673.6

(51) Int. Cl.
*G06F 3/041* (2006.01)
*G09G 3/20* (2006.01)
*H01Q 1/24* (2006.01)

(52) U.S. Cl.
CPC ........ *G06F 3/04184* (2019.05); *G06F 3/0412* (2013.01); *G06F 3/04164* (2019.05);
(Continued)

(58) Field of Classification Search
CPC ............... G06F 3/04184; G06F 3/0412; G06F 3/04164; G09G 3/2096; G09G 2310/0267;
(Continued)

(56) References Cited

U.S. PATENT DOCUMENTS 11,972,070 B1 * 4/2024 Paul ...................... G06F 3/0416
2017/0262120 A1 * 9/2017 Liu ...................... G06F 3/0412
(Continued)

FOREIGN PATENT DOCUMENTS

CN 103324333 A 9/2013
CN 104123041 A * 10/2014 ......... G06F 3/04162
(Continued)

*Primary Examiner* — Amit Chatly
(74) *Attorney, Agent, or Firm* — WHDA, LLP

(57) ABSTRACT

A touch display substrate and driving method thereof, a drive circuit, and a display device, relate to the technical field of display. The drive circuit is applied to a touch display substrate and a communication coil of the touch display substrate, and includes: a touch display module, connected to the touch display substrate; a communication module, connected to the communication coil, and configured for providing a communication signal to the communication coil during a communication phase; and a processing mod-
(Continued)

ule, connected to the touch display module and the communication module, and configured for providing asynchronization signal to the touch display module; among them, the touch display module is configured for: according to the synchronization signal, driving the touch display substrate to perform first touch detection and first screen display, wherein a first touch detection phase does not overlap with the communication phase.

19 Claims, 8 Drawing Sheets

(52) U.S. Cl.
CPC ............ *G09G 3/2096* (2013.01); *H01Q 1/24* (2013.01); *G09G 2310/0267* (2013.01); *G09G 2310/0286* (2013.01); *G09G 2340/0435* (2013.01); *G09G 2354/00* (2013.01)

(58) Field of Classification Search
CPC ... G09G 2310/0286; G09G 2340/0435; G09G 2354/00; H01Q 1/24
See application file for complete search history.

(56) References Cited

U.S. PATENT DOCUMENTS

| | | | | |
|---|---|---|---|---|
| 2018/0059864 A1* | 3/2018 | Pham | .................... | G06F 3/0412 |
| 2023/0058372 A1* | 2/2023 | Li | ......................... | G06F 1/1698 |

FOREIGN PATENT DOCUMENTS

| | | |
|---|---|---|
| CN | 106453843 A | 2/2017 |
| CN | 106791187 A | 5/2017 |
| CN | 105224136 B | 2/2018 |

* cited by examiner

TOUCH-CONTROL DISPLAY SUBSTRATE AND DRIVING METHOD THEREFOR, DRIVING CIRCUIT, AND DISPLAY DEVICE

CROSS-REFERENCE TO RELATED APPLICATION

This application claims the priority of the Chinese Patent application filed on Jul. 31, 2023 before the CNIPA, China National Intellectual Property Administration with the application number of 202310952673.6, and the title of "TOUCH DISPLAY SUBSTRATE AND DRIVING METHOD THEREOF, DRIVE CIRCUIT, AND DISPLAY DEVICE", which is incorporated herein in its entirety by reference.

TECHNICAL FIELD

The present disclosure relates to the technical field of display and more particularly, to a touch display substrate and driving method thereof, a drive circuit, and a display device.

BACKGROUND

Near Field Communication (NFC) has the advantages of high security, fast response speed, and low cost, and is widely used in fields such as a mobile payment, an electronic ticket, and access control.

SUMMARY

The present disclosure provides a drive circuit, applied to a touch display substrate and a communication coil of the touch display substrate, wherein the drive circuit includes:

a touch display module, connected to the touch display substrate;

a communication module, connected to the communication coil, and configured for providing a communication signal to the communication coil during a communication phase; and a processing module, connected to the touch display module and the communication module, and configured for providing asynchronization signal to the touch display module;

wherein the touch display module is configured for: according to the synchronization signal, driving the touch display substrate to perform first touch detection and first screen display, wherein a first touch detection phase does not overlap with the communication phase.

In some embodiments, the communication phase includes a monitoring phase, the communication signal includes a monitoring signal, and the communication module is configured for: providing the monitoring signal to the communication coil during the monitoring phase;

the synchronization signal includes a first synchronization signal, and the first synchronization signal is used for indicating beginning of the monitoring phase; and the touch display module is configured for: after receiving the first synchronization signal for a first duration, driving the touch display substrate to perform the first touch detection and the first screen display, wherein the first duration is a duration of the monitoring phase.

In some embodiments, the first touch detection phase, a first screen display phase and the monitoring phase are three different phases located in one frame period.

In some embodiments, the first touch detection phase is located between the first screen display phase and the monitoring phase.

In some embodiments, the communication phase includes a reading-writing phase, the communication signal includes a reading-writing signal, and the communication module is configured for: providing the reading-writing signal to the communication coil during the reading-writing phase;

the synchronization signal includes a second synchronization signal and a third synchronization signal, the second synchronization signal is used for indicating beginning of the reading-writing phase, the third synchronization signal is used for indicating end of the reading-writing phase, and the processing module is configured for: providing the second synchronization signal and the third synchronization signal to the touch display module in sequence; and the touch display module is configured for: after receiving the second synchronization signal and before receiving the third synchronization signal, driving the touch display substrate to perform the first screen display, and stopping the first touch detection.

In some embodiments, the touch display module is further configured for: in N frame periods after receiving the third synchronization signal, driving the touch display substrate to perform the first screen display, and stopping the first touch detection, wherein N is a positive integer.

In some embodiments, Nis greater than or equal to 1 and less than or equal to 3.

In some embodiments, the processing module is further configured for:

acquiring power of the monitoring signal; and if the power is greater than or equal to a first threshold, providing the first synchronization signal to the touch display module.

In some embodiments, the processing module is further configured for: if the power is less than or equal to a second threshold, providing an indication signal to the touch display module, wherein the second threshold is less than or equal to a first threshold; and the touch display module is further configured for: according to the indication signal, driving the touch display substrate to perform second touch detection and second screen display, wherein a second touch detection phase and/or a second screen display phase overlap with a monitoring phase.

In some embodiments, the processing module is connected to the touch display module through a two-wire serial bus or a flexible circuit board.

The present disclosure provides a touch display substrate, including an active area and a non-active area, wherein the active area includes a communication area and a non-communication area, and the touch display substrate includes:

a touch electrode, located in the active area, and configured for transmitting a touch signal during a touch detection phase;

a valid communication line, located in the communication area, and configured for transmitting a communication signal during a communication phase;

a virtual communication line, located in the non-communication area, and configured for transmitting the touch signal during the touch detection phase;

a plurality of scanning signal lines, located in the active area; and a gate drive circuit, located in the non-active area, wherein the gate drive circuit includes a plurality of shift registers cascaded with each other, output terminals of the plurality of shift registers are connected to the plurality of scanning signal lines, and each of the plurality of shift registers includes a signal generation circuit and a filter circuit connected to an output terminal of the signal generation circuit, the signal generation circuit is configured for generating a scanning signal, and the filter circuit is configured for filtering out a high-frequency harmonic in the scanning signal, wherein a frequency of the high-frequency harmonic includes a frequency of a subcarrier in the communication signal.

In some embodiments, the touch display substrate further includes:

a common signal line, located in the non-active area, connected to the virtual communication line, and configured for providing the touch signal to the virtual communication line during the touch detection phase.

In some embodiments, the touch display substrate further includes:

a connecting line, connected between the touch electrode and the virtual communication line, and configured for transmitting a signal of the touch electrode to the virtual communication line.

In some embodiments, the filter circuit includes a RC filter circuit.

The present disclosure provides a display device, including: the touch display substrate, the communication coil, and the drive circuit according to any one of the above embodiments, wherein the drive circuit is connected to the touch display substrate and the communication coil, and configured for providing a display signal and a touch signal to the touch display substrate, and providing the communication signal to the communication coil.

The present disclosure provides a display device, including:

the touch display substrate according to any one of the above embodiments; and a drive circuit, connected to the touch display substrate, and configured for providing a display signal, the communication signal and the touch signal to the touch display substrate.

The present disclosure provides a driving method of a touch display substrate, wherein the touch display substrate includes a plurality of sub-pixels arranged in array, the touch display substrate supports a first frame frequency and a second frame frequency, the second frame frequency is greater than the first frame frequency, a period corresponding to the first frame frequency is a first frame period, and in one first frame period, the driving method includes:

in a screen refresh phase, charging rows of sub-pixels in the touch display substrate row by row, and a charging duration for each row of sub-pixels is a charging duration for each row of sub-pixels at the second frame frequency;

in a screen holding phase, driving the touch display substrate to perform touch detection.

In some embodiments, a ratio of a duration of the screen holding phase to the first frame period is greater than or equal to 0.3 and less than or equal to 0.5.

In some embodiments, a communication coil of the touch display substrate is used for transmitting a communication signal, and the step of charging rows of sub-pixels in the touch display substrate row by row includes:

in response to triggering of a plurality of effective pulses in a clock signal, charging the rows of sub-pixels in the touch display substrate row by row, wherein the clock signal is a periodic pulse signal, a frequency of the periodic pulse signal is a pulse frequency, and even multiples of the pulse frequency are different from a frequency of the communication signal.

In some embodiments, the pulse frequency is greater than or equal to 10 KHz, and less than or equal to 12 KHz; and/or a frequency of a subcarrier in the communication signal is greater than or equal to 800 KHz.

The above description is only an overview of the technical solution of the present disclosure. In order to have a clearer understanding of the disclosed technical means, it can be implemented according to the content of the specification. In order to make the above and other purposes, features, and advantages of the disclosure more obvious and understandable, the specific implementation methods of the disclosure are listed below.

BRIEF DESCRIPTION OF THE DRAWINGS

In order to more clearly illustrate the technical solution of the embodiments of the present disclosure, a brief introduction will be given to the accompanying drawings required to be used in the embodiments and related art. It is obvious that the accompanying drawings described below are only some embodiments of the present disclosure. For those skilled in the art, other drawings may be obtained based on these drawings without creative work. It should be noted that the scale in the accompanying drawings is only for illustration and does not represent the actual scale.

DETAILED DESCRIPTION

In order to clarify the purpose, technical solution, and advantages of the embodiments of the present disclosure, a clear and complete description of the technical solution in the embodiments of the present disclosure will be provided below in conjunction with the accompanying drawings. Obviously, the described embodiments are a part of the embodiments of the present disclosure, not all of the embodiments. Based on the embodiments of the present disclosure, all other embodiments obtained by persons skilled in the art without creative work are within the scope of protection of the present disclosure.

In related art, NFC coils are made into coil structures on a printed circuit board or a flexible circuit board through metal leads. The printed circuit board or the flexible circuit board including the coils is attached to a battery or a housing of an electronic device. Repeated disassembly and assembly of the battery and the housing can cause wear or misalignment of the NFC coils, affecting the propagation of the NFC signals. This structure of NFC coils occupies a large space inside the electronic device, which increases the thickness of the electronic device and cannot meet the design requirements of small electronic products.

The design of integrating the NFC coils on a display substrate has the advantages of integration and lightweight. By forming an NFC coil structure within a specific film layer on the touch display substrate, the display substrate not only has the display function but also provides the NFC communication function, thus effectively improving the sensitivity and reliability of NFC signals. Furthermore, the display substrate can also integrate the touch circuit to achieve the integration of display, touch, and communication functions. The inventor found that products that integrate NFC coils into the touch display substrates often suffer from touch ghost points or even touch failure, which greatly affects the user experience.

Figure 1:
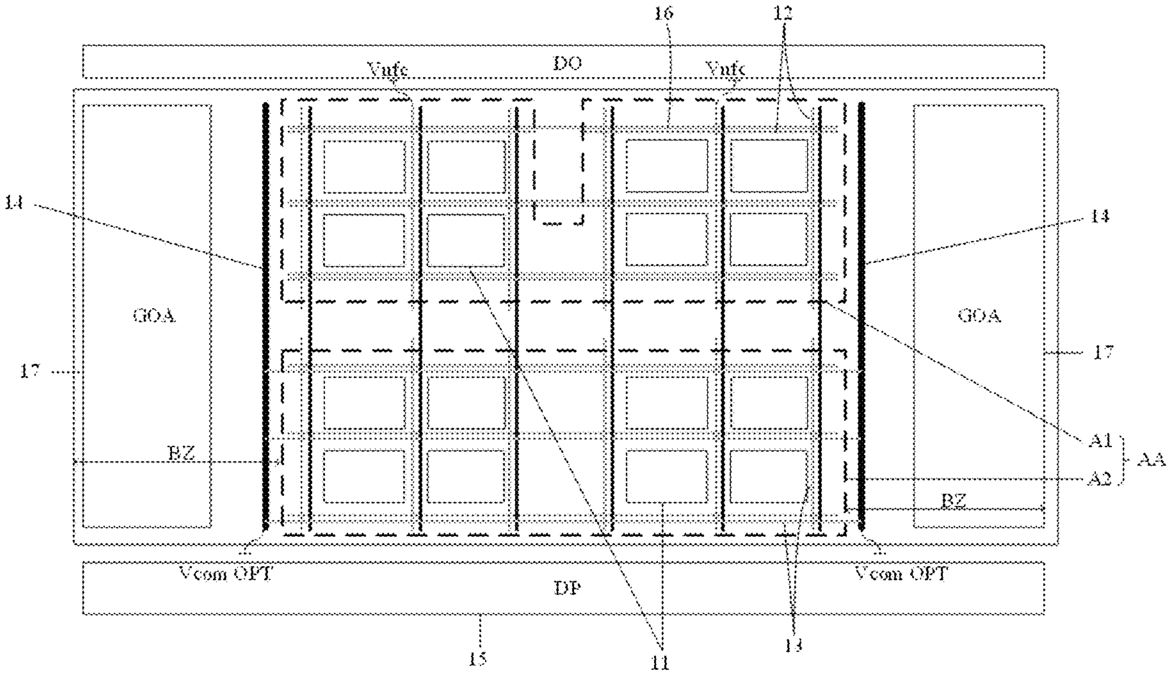
FIG. 1 exemplarily illustrates a schematic structural diagram of a touch display substrate.
Figure 2:
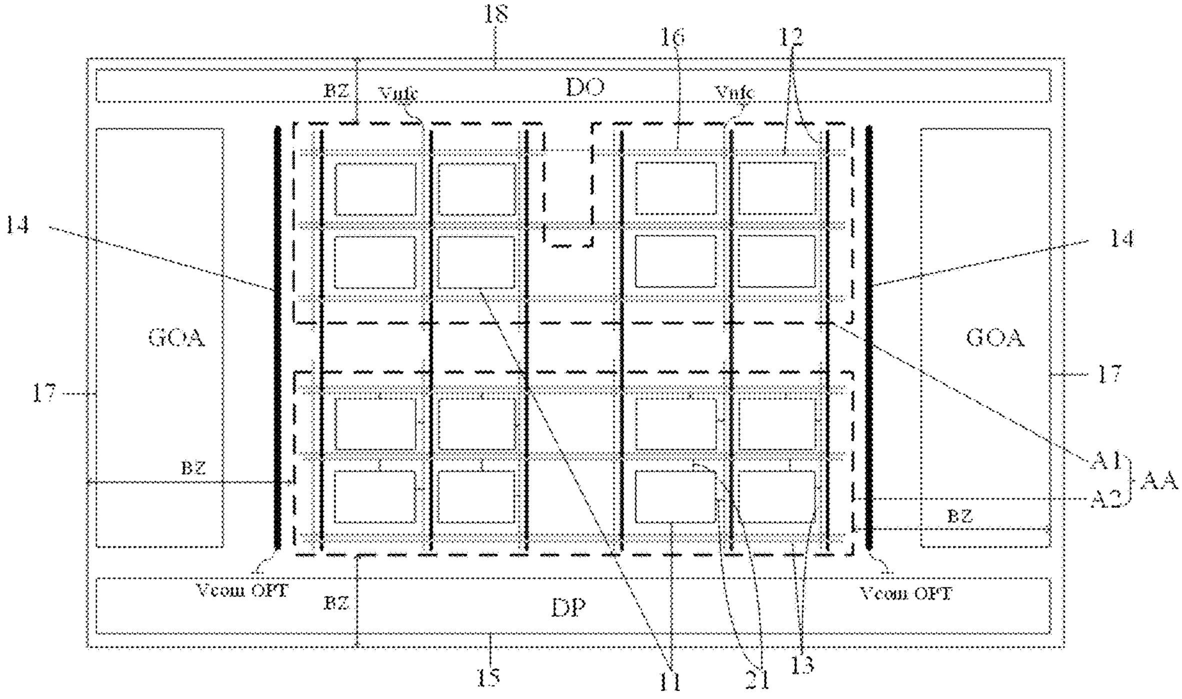
FIG. 2 exemplarily illustrates a schematic structural diagram of another touch display substrate.

The present disclosure provides a touch display substrate, as shown in FIG. 1 or FIG. 2, the touch display substrate includes an active area AA and a non-active area BZ, the active area AA includes a communication area A1 and a non-communication area A2. The touch display substrate includes: a touch electrode 11, located in the active area AA, and configured for transmitting a touch signal during a touch detection phase; a valid communication line 12, located in the communication area A1, and configured for transmitting a communication signal during a communication phase; and a virtual communication line 13, located in the non-communication area A2, and configured for transmitting the touch signal during the touch detection phase.

For example, as shown in FIG. 1 or FIG. 2, in the communication area A1, a plurality of valid communication lines 12 can intersect with each other to form a grid structure, and the intersecting valid communication lines 12 can be connected to each other at an intersection position.

For example, as shown in FIG. 1 or FIG. 2, in the non-communication area A2, a plurality of virtual communication lines 13 can intersect with each other to form a grid structure, and the intersecting virtual communication lines 13 can be connected to each other at an intersection position. By arranging the virtual communication lines 13 in the non-communication area A2, a grid structure which is the same as the grid structure in the communication area A1 can be formed in the non-communication area A2, which can reduce the difference in transmittance between the communication area A1 and the non-communication area A2 and improve the display uniformity of the active area AA.

Figure 5:
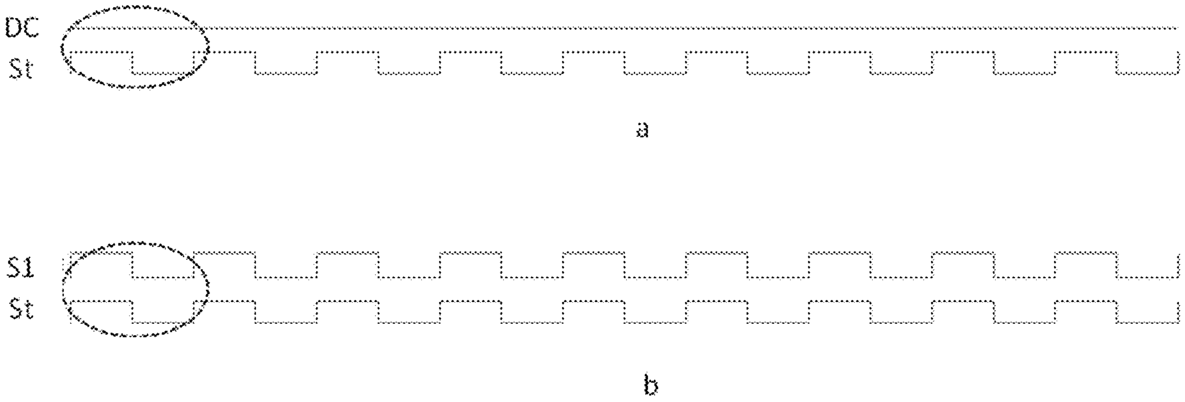
FIG. 5 exemplarily illustrates a signal timing diagram loaded on an auxiliary communication line and a touch electrode.

In related art, as shown in diagram a in FIG. 5, the virtual communication line 13 is connected to the direct current stabilized signal DC or grounded, and the touch electrode 11 is connected to the touch signal St during the touch detection phase, so that the touch problems are prone to occur in the non-communication area A2. The inventor analyzed and found that this is due to the large coupling capacitance between the virtual communication line 13 and the touch electrode 11 in the non-communication area A2. When the voltage on the virtual communication line 13 is not equal the voltage on the touch electrode 11, charge flow will occur, which will cause changes in the touch signal on the touch electrode 11, resulting in abnormal touch function.

The touch display substrate provided in the present disclosure, as shown in diagram b in FIG. 5, may eliminate the voltage difference between the virtual communication line 13 and the touch electrode 11 by making the virtual communication line 13 transmit the same touch signal St as the touch electrode 11 during the touch detection phase, thus eliminating the charge flow caused by coupling capacitance, and ensuring the normal use of the touch function.

For example, the valid communication line 12 is equivalent to the communication coil of the touch display substrate, which may achieve the function of NFC communication.

For example, the touch electrode 11 can also be shared with the common electrode of the sub-pixels within the active area AA, and used to transmit common voltage signals during the non-touch phase.

In order to enable the virtual communication line 13 to transmit the touch signals during the touch detection phase, in the first embodiment, as shown in FIG. 1, the touch display substrate further includes: a common signal line 14, located in the non-active area BZ, connected to the virtual communication line 13, and configured for providing the touch signal to the virtual communication line 13 during the touch detection phase.

For example, as shown in FIG. 1, the common signal line 14 can be connected to the touch display module 15 through a flexible circuit board, and receive the VCOM OPT signal generated by the touch display module 15. In the touch detection phase, the VCOM OPT signal is a signal that has the same amplitude, frequency, and is synchronized with the touch signal, thereby realizing the loading of the touch signals to the virtual communication line 13 in the touch detection phase.

For example, the touch display module 15 is a Touch and Display Driver Integration (TDDI) chip.

For example, the common signal line 14 is also used for providing a common voltage signal to the virtual communication line 13 during the non-touch phase.

In order to enable the virtual communication line 13 to transmit the touch signals during the touch detection phase, in the second embodiment, as shown in FIG. 2, the touch display substrate further includes: a connecting line 21, connected between the touch electrode 11 and the virtual communication line 13, and configured for transmitting a signal of the touch electrode 11 to the virtual communication line 13.

For example, as shown in FIG. 2, the virtual communication line 13 can be connected to the touch electrode 11 nearby through the connection line 21.

Compared with the first embodiment, in the second embodiment, due to the large load on the virtual communication line 13, it is prone to display unevenness. The first embodiment can avoid the problem of uneven display, and since the common signal line 14 is directly connected to the driver chip 15, it will not affect the touch or display functions.

If the touch display substrate is regarded as a field, the signals it covers include a display signal with a high voltage, such as the scanning signal. As the touch display substrate is located between the transmitting antenna and the receiving antenna, the high-order harmonics in these display signals can be spatially coupled to the subcarriers (such as 847 KHz) of the communication signal, thereby affecting the NFC communication function. In addition, since the scanning signal is a square wave, which is the most typical distorted wave composed of various harmonics, and the voltage difference of the scanning signals is large, each-order harmonic has a large amplitude. Therefore, it is necessary to filter out harmonics above 800 KHz in the display signal.

Figure 3:
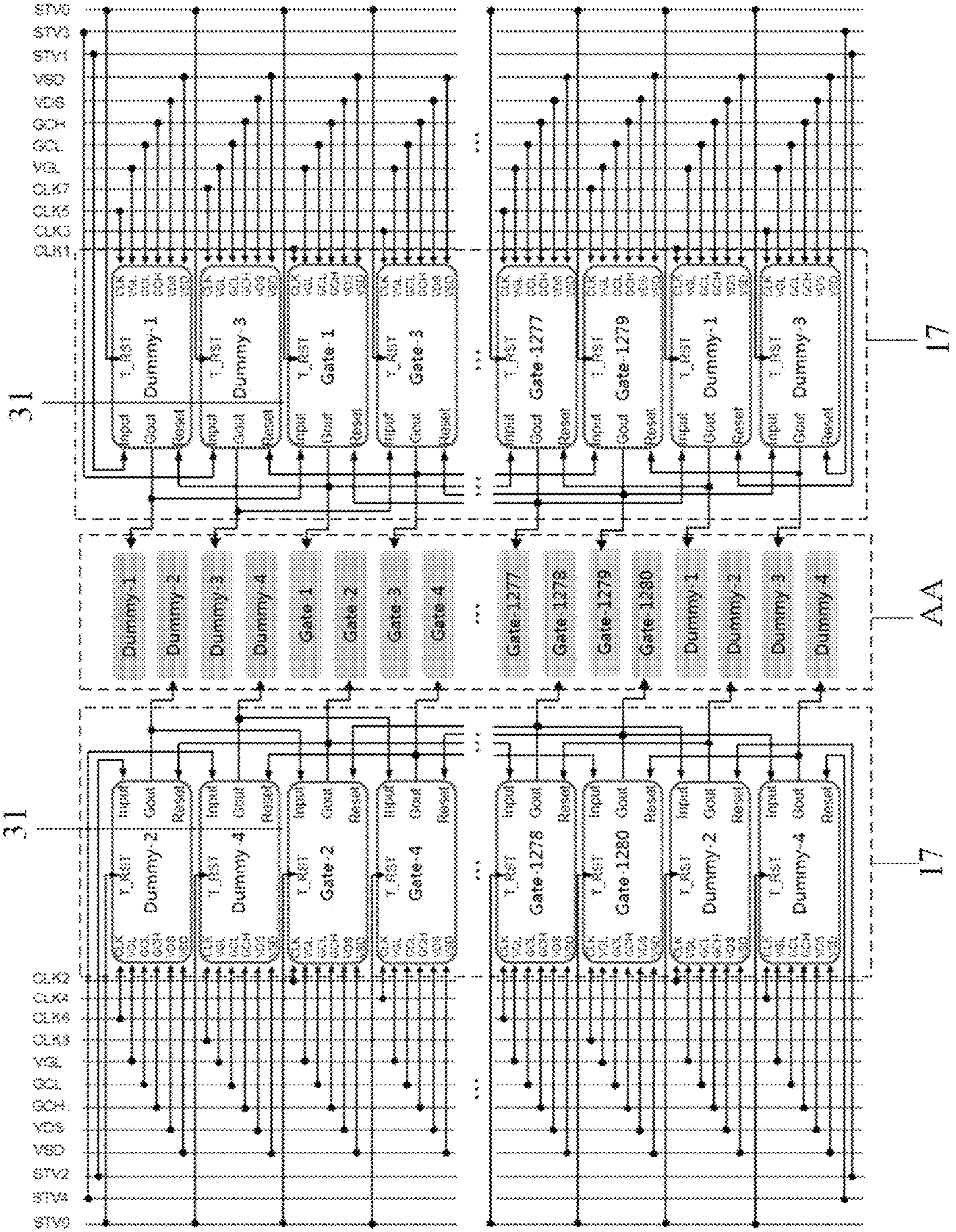
FIG. 3 exemplarily illustrates a schematic structural diagram of a gate drive circuit.

In order to filter out the harmonics above 800 KHz in the scanning signals, in some embodiments, as shown in FIG. 1 or FIG. 2, the touch display substrate further includes: a plurality of scanning signal lines 16, located in the active area AA; and a gate drive circuit 17, located in the non-active area BZ. As shown in FIG. 3, the gate drive circuit 17 includes a plurality of shift registers 31 cascaded with each other, output terminals Gout of the plurality of shift registers 31 are connected to the plurality of scanning signal lines 16. In FIG. 3, gate-1 to gate-1280 are scanning signal lines 16.

Figure 4:
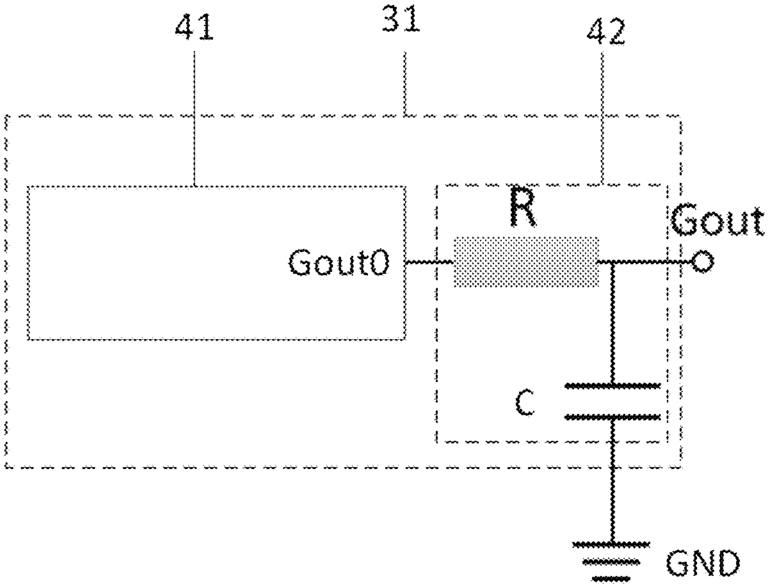
FIG. 4 exemplarily illustrates a schematic structural diagram of a shift register.

As shown in FIG. 4, each of the plurality of shift registers 31 includes a signal generation circuit 41 and a filter circuit 42 connected to an output terminal Gout0 of the signal generation circuit 41, the signal generation circuit 41 is configured for generating a scanning signal, and the filter circuit 42 is configured for filtering out a high-frequency harmonic in the scanning signal, wherein a frequency of the high-frequency harmonic includes a frequency of a subcarrier in the communication signal.

In this embodiment, by setting the filter circuit 42 in the shift register 31, the output terminal Gout0 of the signal generation circuit 41 of the scanning signal is connected to the filter circuit 42, which can filter out harmonic components in the scanning signal that have similar frequencies as the subcarriers in the communication signal, reduce interference with the communication signal, and facilitate the normal use of NFC communication function.

For example, the frequency of the subcarriers in the communication signals can be greater than or equal to 800 KHz, such as 847 KHz, etc.

For example, the filter circuit 42 is a low-pass filter circuit 42, and the cutoff frequency can be set to 800 kHz, for example.

In some implementations, as shown in FIG. 4, the filter circuit 42 includes an RC filter circuit 42.

For example, as shown in FIG. 4, the RC filter circuit 42 includes a resistor R located between the output terminal Gout0 of the signal generation circuit 41 and the output terminal Gout of the shift register 31, and a capacitor C connected between the output terminal Gout of the shift register 31 and the ground potential GND.

According to the cut-off frequency formula of the first-order RC low-pass filter: $f_0=\frac{1}{2}\pi RC$, if the cut-off frequency is set to 800 kHz, the resistance R can be 800Ω and the capacitance C can be 20 pF. In specific implementation, the capacitance value of the capacitor C can be designed to be greater than or equal to 15 pF and less than or equal to 25 pF based on factors such as product resolution, frame rate, and a position of the NFC coil.

In specific implementation, there are two methods to use NFC card swiping: the first method is to place the NFC coil on the back of the display surface of the display substrate, and set ferrite between the NFC coil and the display substrate for isolation, which can achieve good isolation effect; the second method is to place the NFC coil on the outer edge of the casing of the display device, and then place the ferrite on the side of the NFC coil away from the display surface of the display substrate. However, since the distance between the NFC coil and the display substrate is close, and there is no wave-absorbing material such as the ferrite arranged between the NFC coil and the display substrate, the subcarrier signals in the communication signal are easily affected by the display signal, which hinders the development of card swiping applications on the front surface of the screen. Among them, the frequency range of the subcarrier signal is, for example, 800 kHz~900 kHz.

The touch display substrate provided in the embodiment can filter the scanning signal at high frequency from the source, thus effectively reducing the interference of the scanning signal on the subcarrier signal in the communication signal. Therefore, it is conducive to the promotion of the card swiping applications on the front surface.

It should be noted that the touch display substrate provided in the present disclosure is suitable for application scenarios of swiping cards on the back surface or the front surface.

Figure 6:
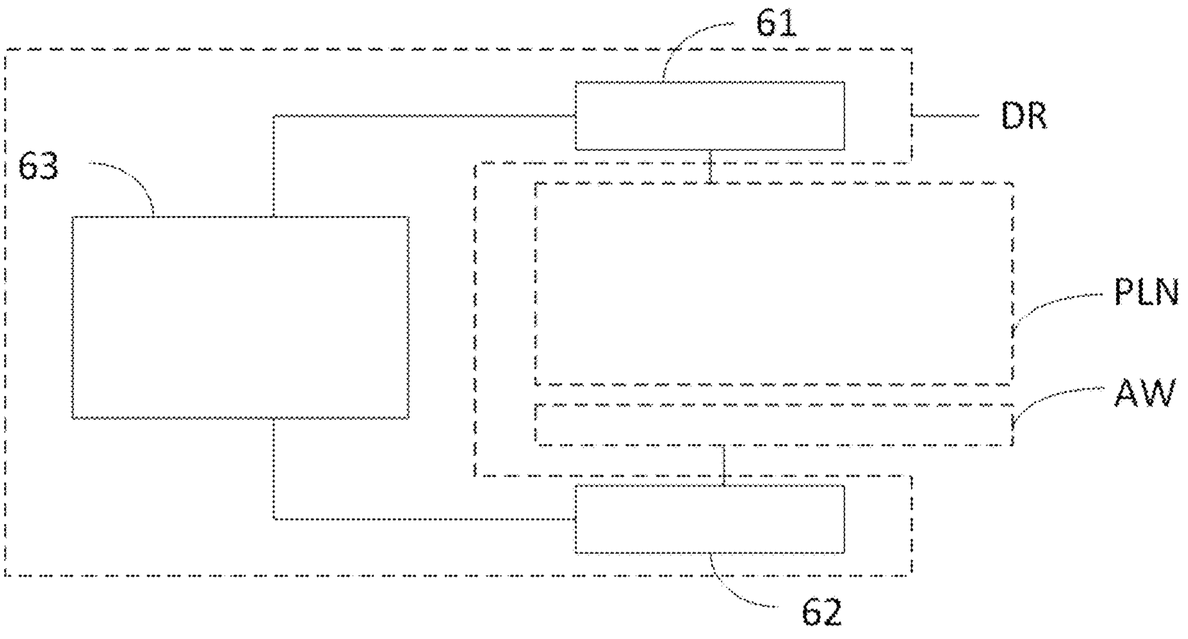
FIG. 6 exemplarily illustrates a schematic structural diagram of a drive circuit.

The present disclosure provides a drive circuit applied to a touch display substrate PNL and a communication coil AW of the touch display substrate PNL, as shown in FIG. 6. The drive circuit includes: a touch display module 61, connected to the touch display substrate PNL; a communication module 62, connected to the communication coil AW, and configured for providing a communication signal to the communication coil AW during a communication phase; and a processing module 63, connected to the touch display module 61 and the communication module 62, and configured for providing a synchronization signal to the touch display module 61.

Among them, the touch display module 61 is configured for: according to the synchronization signal, driving the touch display substrate PNL to perform first touch detection and first screen display, wherein a first touch detection phase TC1 does not overlap with the communication phase.

For example, the synchronization signal is used to indicate the beginning and/or end of the communication phase.

Figure 7:
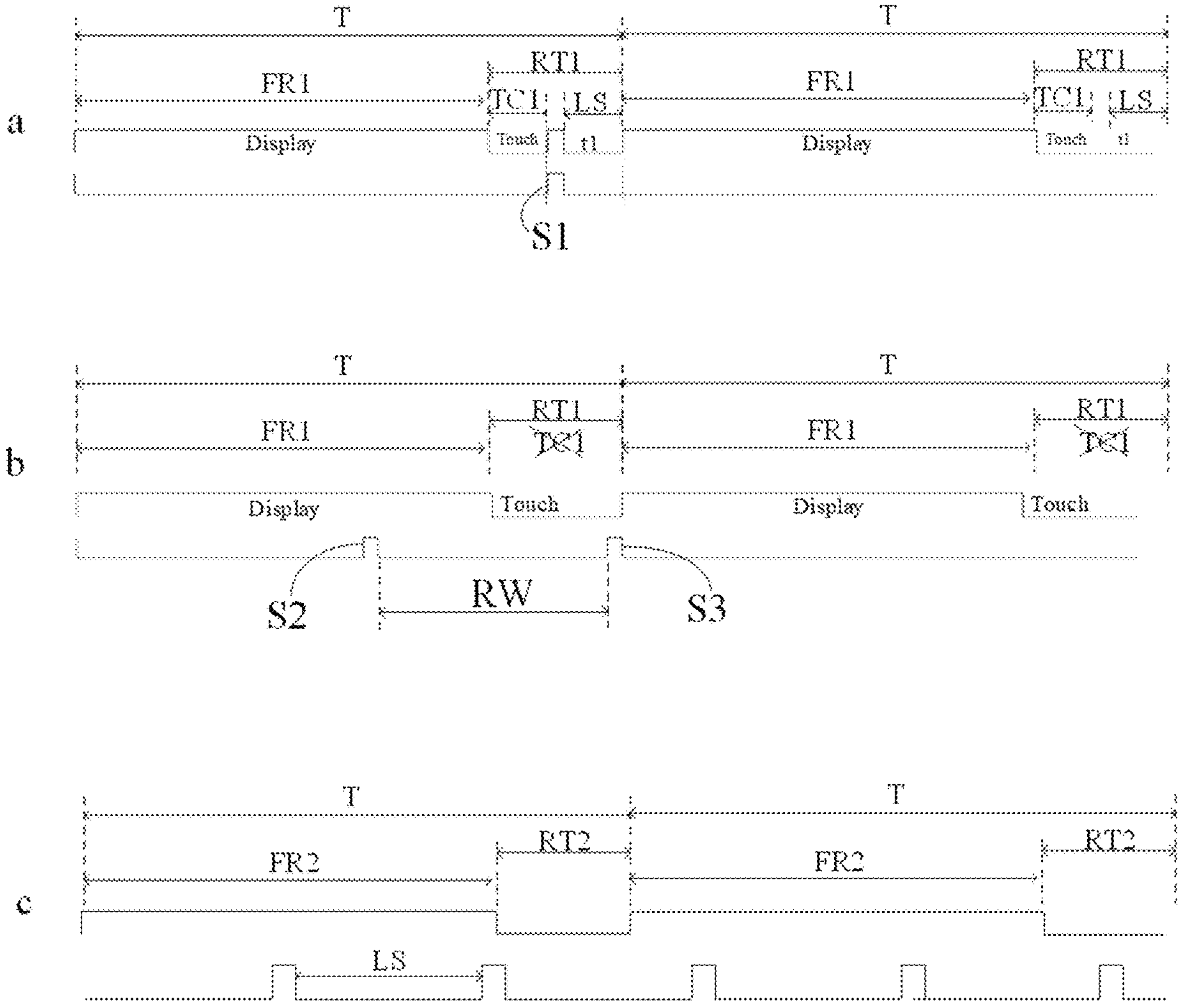
FIG. 7 exemplarily illustrates a signal timing diagram during a monitoring phase and a reading-writing phase.

For example, as shown in FIG. 7, one frame period T can be divided into a first screen refresh phase FR1 and a first screen holding phase RT1. For example, the step of driving the touch display substrate PNL to perform the first screen display by the touch display module 61 can be performed during the first screen refresh phase FR1, and the step of driving the touch display substrate PNL to perform the first touch detection by the touch display module 61 can be performed during the first screen holding phase RT1.

For example, the communication phase may include a monitoring phase LS and a reading-writing phase RW. In the monitoring phase LS, the communication coil AW (i.e. NFC coil) emits a carrier wave at a fixed time to detect whether there are cards around it. After detecting that there is a card, it enters the reading-writing phase RW, and during the reading-writing phase RW, it reads the internal information of the card.

During the monitoring phase LS, the communication coil AW will emit communication signals at a fixed time interval, and the communication signals will have voltage jump. The inventor found that the voltage jump may cause the problem of touch ghost points and may occur at any time during one frame period T.

During the reading-writing phase RW, there is always the voltage jump in the communication signal, the voltage jump can also cause the problem of touch ghost points and may occur at any time during one frame period T. The duration of the reading-writing phase RW is positively correlated with the size of the card information, and in general, the duration of the reading-writing phase RW is greater than the duration performing the touch detection within one frame period T. The inventor also found that switching from the reading-writing phase RW to the monitoring phase LS can also result in the phenomenon of touch ghost points.

The drive circuit provided in the present disclosure ensures that the first touch detection phase TC1 does not overlap with the communication phase through the synchronization signals, that is, the first touch detection phase TC1 and the communication phase are carried out in different time periods. In the communication phase, the touch display module 61 turns off the first touch detection function, and in the non-communication phase, the touch display module 61 starts the first touch detection function. In this way, by conducting communication and first touch detection at different time periods, the noise interference of communication on the touch detection can be more thoroughly eliminated, solving the problems of the touch ghost points and touch failure, and ensuring the normal use of the touch detection function. Among them, the communication phase includes the monitoring phase LS and the reading-writing phase RW.

For example, the touch display substrate PNL can be the touch display substrate PNL provided by any embodiment.

For example, the communication coil AW can be integrated into the touch display substrate PNL, including the valid communication line integrated into the touch display substrate PNL, or can be arranged independently of the touch display substrate PNL, the present disclosure does not limit this.

For example, the processing module 63 can be a microcontroller unit (MCU) on the motherboard.

For example, the touch display module 61 is a Touch and Display Driver Integration (TDDI) chip.

In some embodiments, the communication phase includes a monitoring phase LS, the communication signal includes a monitoring signal, and the communication module 62 is configured for: providing the monitoring signal to the communication coil AW during the monitoring phase LS.

In this embodiment, the synchronization signal includes a first synchronization signal S1, and the first synchronization signal S1 is used for indicating beginning of the monitoring phase LS. Correspondingly, as shown in diagram a in FIG. 7, the touch display module 61 is configured for: after receiving the first synchronization signal S1 for a first duration, driving the touch display substrate PNL to perform the first touch detection and the first screen display, wherein the first duration t1 is a duration of the monitoring phase LS.

For example, as shown in diagram a in FIG. 7, the first screen holding phase RT1 can be divided into a first touch detection phase TC1 and a monitoring phase LS. For example, the step of driving the touch display substrate PNL to perform the first touch detection by the touch display module 61 can be performed in the first touch detection phase TC1, and the step of the monitoring phase LS performed by the communication module 62 can be performed during the monitoring phase LS.

For example, in the first screen holding phase RT1, the first touch detection phase TC1 can be performed before the monitoring phase LS, as shown in diagram a in FIG. 7. Certainly, in the first screen holding phase RT1, the first touch detection phase TC1 can also be performed after the monitoring phase LS, and the present disclosure does not limit this.

For example, as shown in diagram a in FIG. 7, the touch display integrated chip can first drive the touch display substrate PNL to perform the first screen display after receiving the first synchronization signal S1 for the first duration t1, and then drive the touch display substrate PNL to perform the first touch detection.

As shown in diagram a in FIG. 7, when the touch display module 61 receives the first synchronization signal S1, the communication module 62 begins to execute the steps of the monitoring phase LS, and the monitoring phase LS ends after the monitoring phase LS lasts for the first duration t1. Afterwards, the touch display module 61 drives the touch display substrate PNL to sequentially perform the first screen display and the first touch detection. In this way, through the first synchronization signal S1, it may achieve time-division of the monitoring phase LS and the first touch detection, eliminating the touch ghost points and touch failure problems that may occur during the monitoring phase LS.

In some embodiments, as shown in diagram a in FIG. 7, the first touch detection phase TC1, a first screen display phase FR1 and the monitoring phase LS are three different phases located in one frame period.

In order to further reduce the impact of communication on the touch detection, the first touch detection phase TC1 is located between the first screen display phase FR1 and the monitoring phase LS.

For example, as shown in diagram a in FIG. 7, within one frame period T, the first screen display phase FR1, the first touch detection phase TC1, and the monitoring phase LS are sequentially performed without overlapping, which can ensure that the screen display, touch, and communication do not interfere with each other and eliminate the problems of the touch ghost points and touch failure.

In some embodiments, the communication phase includes a reading-writing phase RW, the communication signal includes a reading-writing signal, and the communication module 62 is configured for: providing the reading-writing signal to the communication coil AW during the reading-writing phase RW.

In this embodiment, the synchronization signal includes a second synchronization signal and a third synchronization signal, the second synchronization signal is used for indicating beginning of the reading-writing phase RW, the third synchronization signal is used for indicating end of the reading-writing phase RW, and the processing module 63 is configured for: providing the second synchronization signal S2 and the third synchronization signal S3 to the touch display module 61 in sequence.

Correspondingly, as shown in diagram b in FIG. 7, the touch display module 61 is configured for: after receiving the second synchronization signal S2 and before receiving the third synchronization signal S3, driving the touch display substrate PNL to perform the first screen display, and stopping the first touch detection.

For example, as shown in diagram b in FIG. 7, the reading-writing phase RW can occur during the first screen refresh phase FR1 and/or the first screen holding phase RT1.

As shown in diagram b in FIG. 7, firstly, the touch display module 61 receives the second synchronization signal S2, and the reading-writing phase RW begins. Afterwards, the touch display module 61 receives the third synchronization signal S3, and the reading-writing phase RW ends. During the first screen refresh phase FR1 of the reading-writing phase RW, the touch display module 61 drives the touch display substrate PNL to perform the first screen display. During the first screen holding phase RT1 of the reading-writing phase RW, the first touch detection is stopped. In this way, during the reading-writing phase RW, the touch detection function is stopped and the display function is normal. In this way, by using the second synchronization signal S2 and the third synchronization signal S3, it may achieve time-division of the reading-writing phase RW and the touch detection, thus eliminating the touch ghost points and touch failure problems that may occur during the reading-writing phase RW.

In some embodiments, the touch display module 61 is further configured for: in N frame periods after receiving the third synchronization signal S3, driving the touch display substrate PNL to perform the first screen display, and stopping the first touch detection, wherein N is a positive integer.

As shown in diagram b in FIG. 7, when the touch display module 61 receives the third synchronization signal S3, the reading-writing phase RW ends. During the first screen refresh phase FR1 in N frame periods T after the reading-writing phase RW ends, the touch display module 61 drives the touch display substrate PNL to perform the first screen display, and during the first screen holding phase RT1 in the N frame periods T after the reading-writing phase RW ends, the touch display module 61 stops the first touch detection. That is to say, in the N frame periods T after the reading-writing phase RW ends, the touch detection function is stopped, and the display function is normal. This can solve the touch ghost points and touch failure problems caused by mode switching.

In some embodiments, Nis greater than or equal to 1 and less than or equal to 3.

For example, as shown in diagram b in FIG. 7, after receiving the third synchronization signal S3, the touch display module 61 pauses the touch detection function of the current one frame. Then, based on the received synchronization signal, the touch display substrate PNL is driven to perform the first touch detection and the first screen display.

In some embodiments, the processing module 63 is further configured for: acquiring power of the monitoring signal; and if the power is greater than or equal to a first threshold, providing the first synchronization signal S1 to the touch display module 61.

In the case where the power of the monitoring signal is high, conventional filtering algorithms cannot completely eliminate the noise interference caused by the communication signals on the touch signals. In this case, it is necessary to implement the time-division of the monitoring phase LS and the touch detection phase through the first synchronization signal S1, so as to ensure the normal use of the touch functions.

In some embodiments, the processing module 63 is further configured for: if the power is less than or equal to a second threshold, providing an indication signal to the touch display module 61, wherein the second threshold is less than or equal to a first threshold. Correspondingly, the touch display module 61 is further configured for: according to the indication signal, driving the touch display substrate PNL to perform second touch detection and second screen display, wherein a second touch detection phase and/or a second screen display phase overlap with a monitoring phase.

For example, as shown in diagram c in FIG. 7, one frame period T can be divided into a second screen refresh phase FR2 and a second screen holding phase RT2. For example, in the second screen refresh phase FR2, the touch display module 61 drives the touch display substrate PNL to perform the second screen display, and in the second screen holding phase RT2, the touch display substrate PNL is driven to perform the second touch detection. As shown in diagram c in FIG. 7, the second screen refresh phase FR2 and the second screen holding phase RT2 both overlap with the monitoring phase LS.

In the case where the power of the monitoring signal is small, conventional filtering algorithms can eliminate the noise interference caused by the communication signals on the touch signals. This ensures the normal use of the touch functions even if the monitoring phase LS and the touch detection phase are performed simultaneously, and can also achieve real-time uninterrupted touch, thus improving touch detection performance. Therefore, in the case where the power of the monitoring signal is small, this embodiment supports both touch function and monitoring function simultaneously.

In some embodiments, the processing module 63 is connected to the touch display module 61 through a two-wire serial bus.

In this embodiment, the processing module 63 can send the synchronization signals to the touch display module 61 through the two-wire serial bus. Among them, the synchronization signal may include, for example, the first synchronization signal S1 (such as 00) used to indicate the beginning of the monitoring phase LS, the second synchronization signal S2 (such as 01) used to indicate the beginning of the reading-writing phase RW, and the third synchronization signal S3 (such as 10) used to indicate the end of the reading-writing phase RW.

In this embodiment, the processing module 63 can also send the same synchronization signal to the communication module 62 through the GPIO interface on the board. For example, the communication module 62 can start the monitoring phase LS based on the first synchronization signal S1, start the reading-writing phase RW based on the second synchronization signal S2, and end the reading-writing phase RW based on the third synchronization signal S3.

This embodiment does not require special changes to the hardware of the processing module 63, and the range of hardware options is wider.

In some embodiments, the processing module 63 is connected to the touch display module 61 through a flexible circuit board.

For example, the processing module 63 can use a general purpose input/output (GPIO) port on the hardware to send the analog synchronization signals to the touch display module 61 through the flexible circuit board. The touch display module 61 then determines the type of the synchronization signal based on the received analog synchronization signal. Among them, the types of the synchronization signals may include: the first synchronization signal S1 indicating the beginning of the monitoring phase LS, the second synchronization signal S2 indicating the beginning of the reading-writing phase RW, and the third synchronization signal S3 indicating the end of the reading-writing phase RW.

The present disclosure provides a display device, as shown in FIG. 6, including: the touch display substrate PNL, the communication coil AW, and the drive circuit DR according to any one of the embodiments, wherein the drive circuit DR is connected to the touch display substrate PNL and the communication coil AW, and configured for providing a display signal and a touch signal to the touch display substrate PNL, and providing the communication signal to the communication coil AW.

In the present disclosure, the communication coil AW can be integrated into the touch display substrate PNL or arranged independently of the touch display substrate PNL.

Persons skilled in the art can understand that the display device has the advantages of the drive circuit provided in the previous embodiments.

The present disclosure provides a display device, as shown in FIG. 6, including: the touch display substrate according to any one of the embodiments; and a drive circuit DR, connected to the touch display substrate PNL, and configured for providing a display signal, the touch signal and the communication signal to the touch display substrate PNL.

In the present disclosure, the touch display substrate PNL includes the valid communication line 12, which is equivalent to integrating the communication coil AW.

Persons skilled in the art can understand that the display device has the advantages of the touch display substrate PNL provided in the previous embodiments.

For example, the display device provided in the present disclosure is a product with image display function. For example, the display device can be any one of the following: the monitor, the television, the billboard, the digital photo frame, the laser printer with the display function, the telephone, the mobile phone, the personal digital assistant (PDA), the sales terminal, the digital camera, the portable camcorder, the viewfinder, the navigation device, the vehicle, the large area wall, the home appliance, the information query equipment (such as a business query equipment in e-government, banking, hospitals, power and other departments), and the monitor. The display device can also be a micro display or a product including the micro display. The products including the micro display can be any one of smart watches, smart bracelets, helmet displays, stereoscopic display glasses, AR devices (such as AR glasses), and VR devices (such as VR glasses).

The present disclosure provides a driving method of a touch display substrate PNL, the touch display substrate PNL includes a plurality of sub-pixels arranged in array, the touch display substrate PNL supports a first frame frequency and a second frame frequency, the second frame frequency is greater than the first frame frequency, a period corresponding to the first frame frequency is a first frame period T1, and in one first frame period T1, the driving method includes:

step S11: in a screen refresh phase FR, charging rows of sub-pixels in the touch display substrate PNL row by row, and a charging duration for each row of sub-pixels is a charging duration for each row of sub-pixels at the second frame frequency.

Step S12: in a screen holding phase RT, driving the touch display substrate PNL to perform touch detection.

Figure 8:
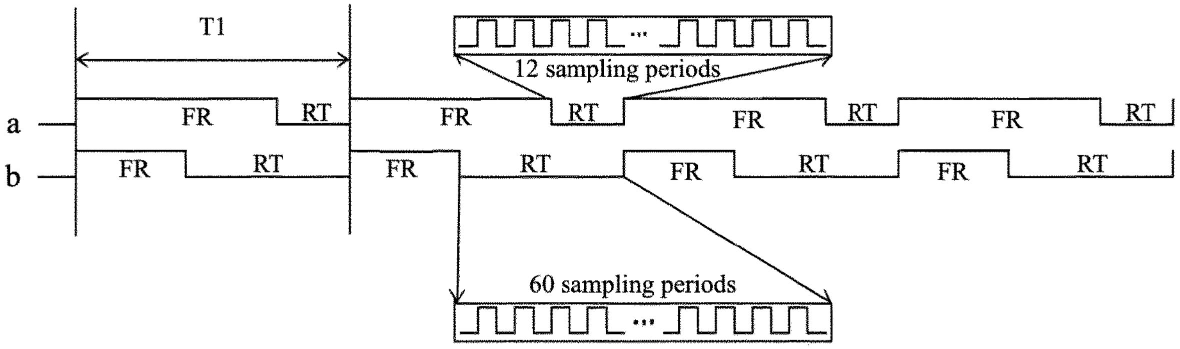
FIG. 8 exemplarily illustrates a signal timing diagram of a drive process.

For example, the charging duration of a single row of sub-pixels multiplied by the number of rows of sub-pixels is approximately equal to the duration of the screen refresh phase FR. As shown in FIG. 8, the total duration of the screen refresh phase FR and the screen holding phase RT is one frame period T.

For example, the first frame frequency may be 60 Hz, and the second frame frequency may be 90 Hz or 120 Hz; or the first frame frequency may be 90 Hz, and the second frame frequency may be 120 Hz.

The driving method provided in the present disclosure can be applied to the touch display substrate PNL provided in any embodiment.

Figure 9:
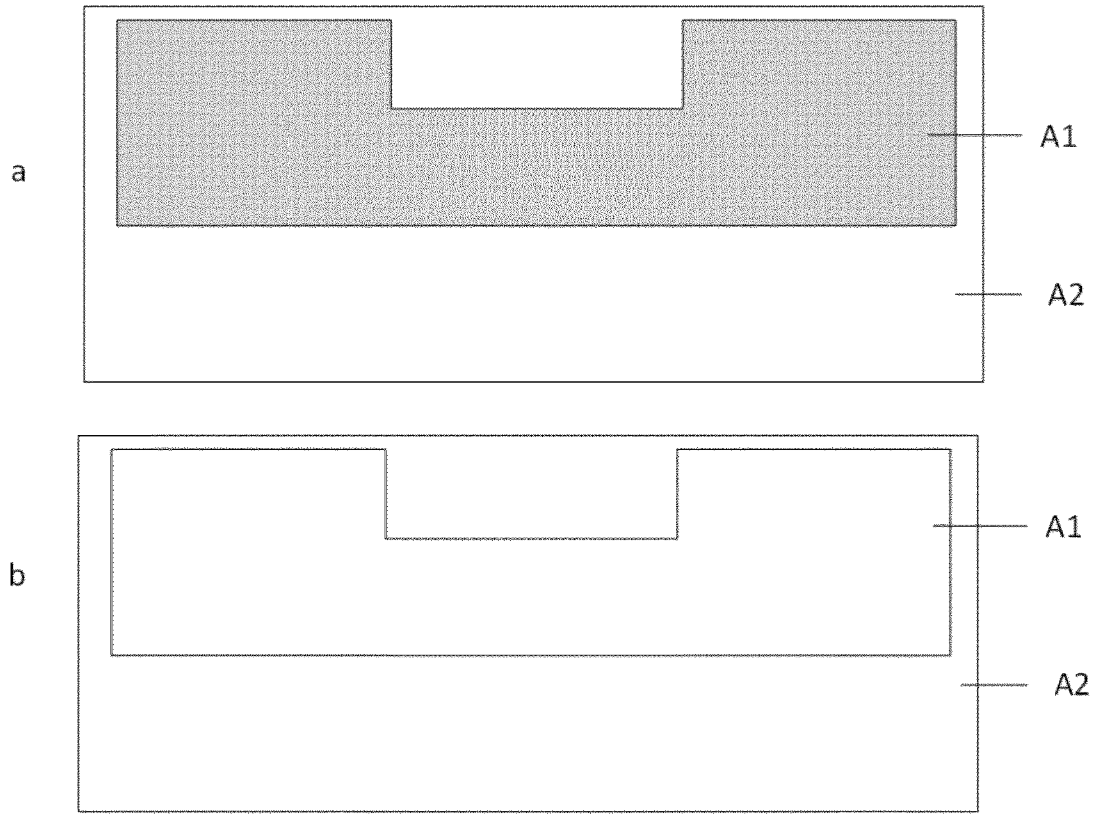
FIG. 9 exemplarily illustrates a schematic diagram of results of two types of touch detection.

In related art, when the frame frequency is the first frame frequency, the charging duration of the single row of sub-pixels is the same as the charging duration of the single row of sub-pixels at the first frame frequency. The charging duration of the single row of sub-pixels is longer, therefore, the duration of the screen refresh phase FR is longer, the duration of the screen holding phase RT used for touch detection is shorter, and the number of touch sampling periods is smaller. Taking the touch display substrate PNL with a size of 5.65 inches and a resolution of 720RGB×1440 as an example, as shown in diagram a in FIG. 8, at the first frame frequency of 60 Hz, the charging duration of the single row of sub-pixels is 10 microseconds, the duration of the screen refresh phase FR is 14.67 ms, the duration of the screen holding phase RT is 2 ms, and the number of the touch sampling periods is 12. In this case, there is a problem of touch ghost points. Referring to diagram a in FIG. 9, it shows a schematic diagram of touch detection results in related art, and there is a risk of reporting points in the communication area A1 (gray area in the figure).

For the driving method provided in the present disclosure, when the frame frequency is the first frame frequency, the charging duration of the single row of sub-pixels is the same as the charging duration of the single row of sub-pixels at the second frame frequency, which is less than the charging duration of the single row of sub-pixels at the first frame frequency. This is equivalent to shortening the charging duration of the single row of sub-pixels, thereby shortening the duration of the screen refresh phase FR, extending the duration of the screen holding phase RT, and increasing the number of touch sampling periods. Taking the touch display substrate PNL with the size of 5.65 inches and the resolution of 720RGB×1440 as an example, as shown in diagram b in FIG. 8, at the first frame frequency of 60 Hz, the charging duration of the single row of sub-pixels is reduced from around 10 microseconds to around 6.5 microseconds (the charging duration of the single row of sub-pixels at the second frame frequency of 90 Hz). The charging duration of the single row of sub-pixels is shortened by one-third, and the duration of the screen holding phase RT is extended from the original 2 ms to around 7.5 ms. As a result, the number of the touch sampling periods is increased from 12 to 60, which can collect more noise data, improve noise optimization effect and anti-noise ability, and enhance the signal-to-noise ratio of the touch signals. Referring to diagram b in FIG. 9, a schematic diagram of the touch detection results of the driving method provided in the present disclosure is shown. There is no risk of reporting points in the entire active area AA, including the communication area A1 and the non-communication area A2.

Figure 10:
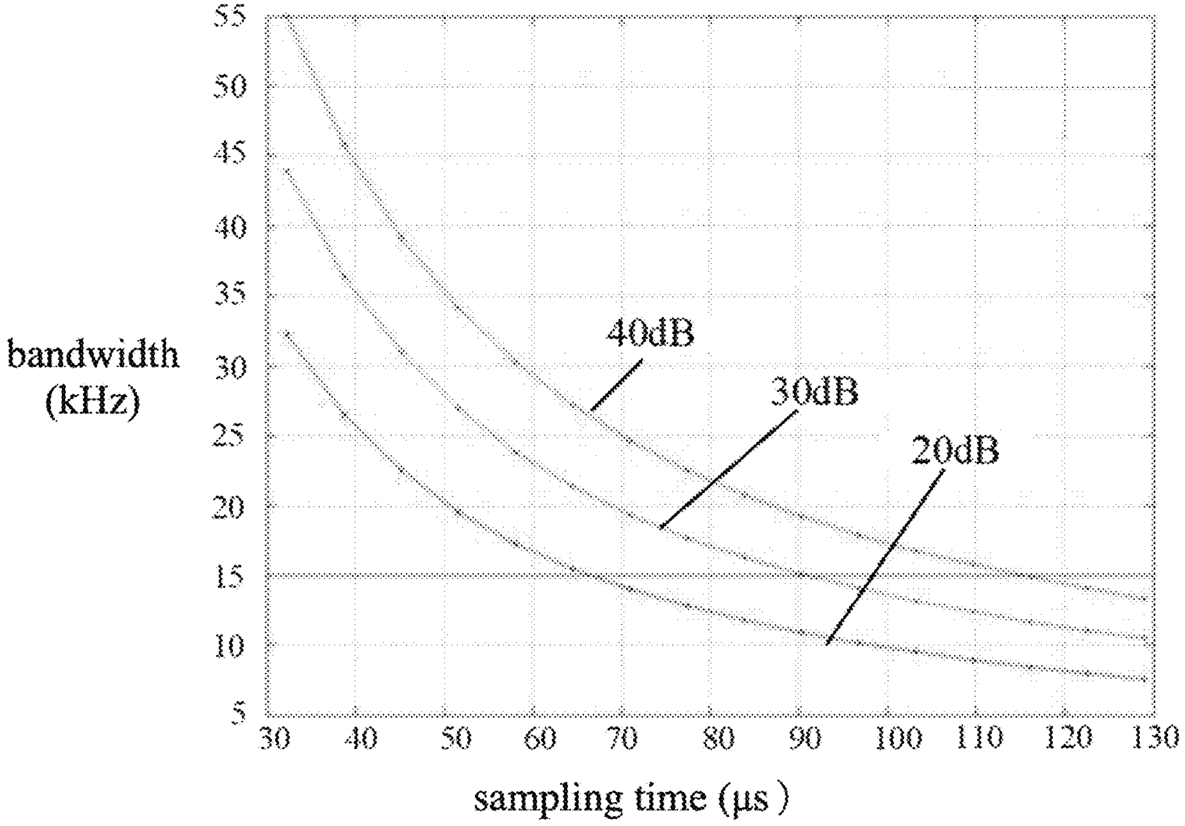
FIG. 10 exemplarily illustrates a variation curve of filter bandwidth with sampling time.

In practical implementation, the bandwidth of the digital filter can be reduced to avoid the operating frequency of NFC. The multi-point mean filtering formula is as follows:

$$H[f] = \frac{\sin(\pi f M)}{M\ \sin(\pi f)}$$

Where f is the sampling frequency, M is the number of sampling points, and H is the bandwidth. It can be observed that at the same sampling frequency, the more sampling points there are, the smaller the bandwidth of the filter, as shown in FIG. 10, which can filter out more noise signals. The higher the signal-to-noise ratio, the better the ability to resist noise interference.

The driving method provided in the present disclosure can improve the noise filtering effect and enhance the signal-to-noise ratio by extending the duration of touch detection and increasing the number of sampling points.

In some embodiments, a ratio of a duration of the screen holding phase RT to the first frame period T1 is greater than or equal to 0.3 and less than or equal to 0.5. For example, the ratio of the duration of the screen holding phase RT to the first frame period T1 is 0.45.

Figure 11:
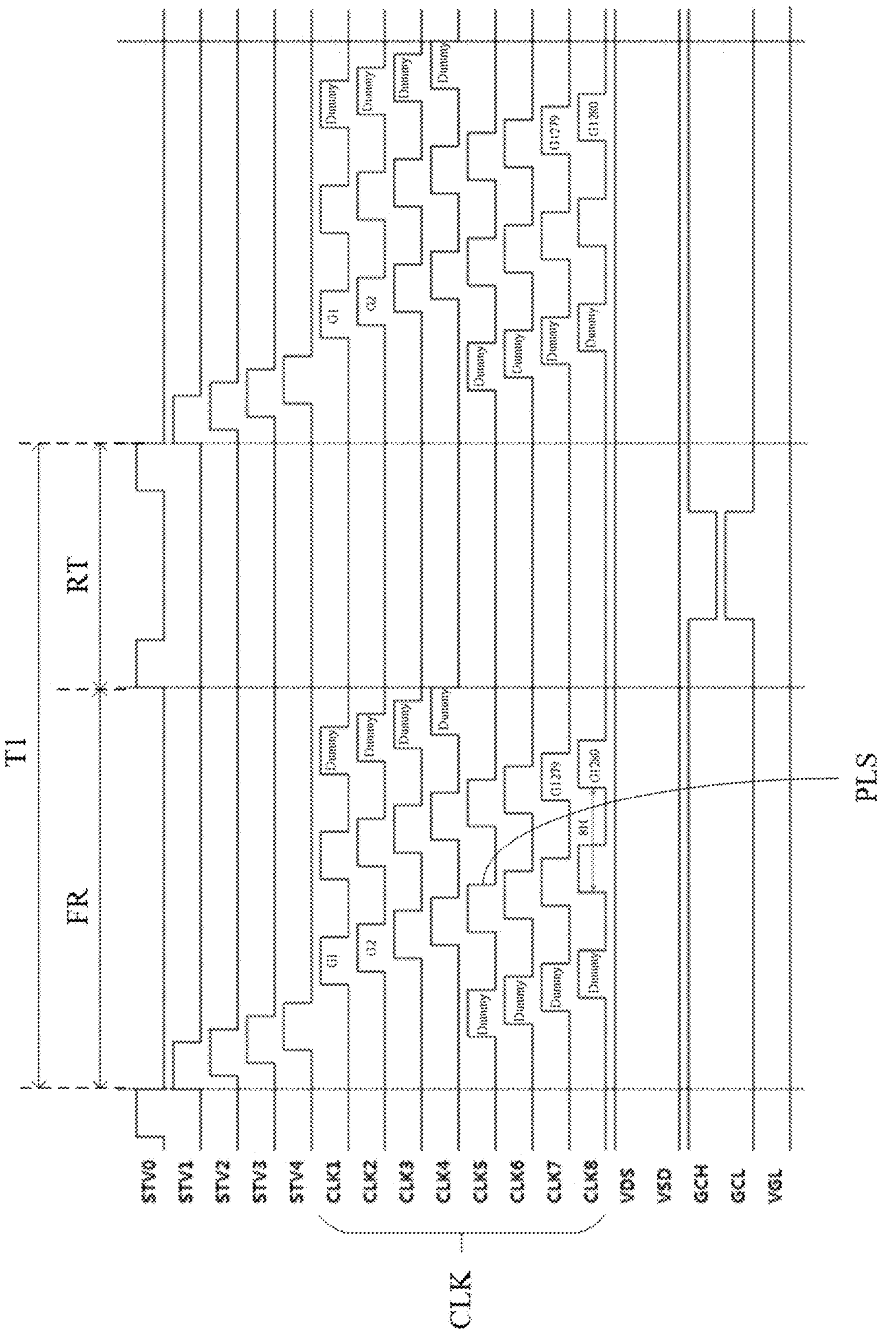
FIG. 11 exemplarily illustrates another signal timing diagram of a drive process.

In some embodiments, a communication coil AW of the touch display substrate PNL is used for transmitting a communication signal, and the step S11 may include:

step S21: in response to triggering of a plurality of effective pulses PLS in a clock signal CLK, charging the rows of sub-pixels in the touch display substrate PNL row by row. As shown in FIG. 11, the clock signal CLK is a periodic pulse signal, a frequency of the periodic pulse signal is a pulse frequency, and even multiples of the pulse frequency are different from a frequency of the communication signal.

For example, the pulse frequency can be the scanning frequency, such as the product of the frame frequency of the touch display substrate PNL and the number of rows of sub-pixels.

For example, the clock signal CLK is a square wave signal with an amplitude of 30V.

In specific implementation, the pulse frequency can be adjusted to prevent the even multiples of the pulse frequency from falling within the frequency range of the communication signal, such as preventing the even multiples of the pulse frequency from being 847 KHz.

By changing the pulse frequency, the duration of the screen holding phase RT and the duty cycle of the clock signal CLK can be adjusted accordingly.

In some embodiments, the pulse frequency is greater than or equal to 10 KHz, and less than or equal to 12 KHz.

For example, taking the touch display substrate PNL with full HD and a frame frequency of 60 Hz as an example, the pulse frequency is greater than or equal to 10 KHz and less than or equal to 12 KHz.

In some embodiments, a frequency of a subcarrier in the communication signal is greater than or equal to 800 KHz.

Among them, the center frequency of the operating frequency band of the NFC coil is 13.56 Mhz.

For example, the communication coil AW can be integrated into the touch display substrate PNL or arranged independently of the touch display substrate PNL, and the present disclosure does not limit it.

In the present disclosure, the meaning of "multiple" refers to two or more, and the meaning of "at least one" refers to one or more, unless otherwise specified.

In the present disclosure, the terms "up", "down", etc. indicate orientation or positional relationships based on the orientation or positional relationships shown in the accompanying drawings, only for the convenience of describing the present disclosure and simplifying the description, and do not indicate or imply that the device or component referred to must have a specific orientation, be constructed and operated in a specific orientation, and therefore cannot be understood as a limitation of the present disclosure.

In this specification, the terms "including/comprising", "containing", or any other variation thereof are intended to encompass non-exclusive inclusion, such that a process, method, product, or equipment that includes a series of elements includes not only those elements, but also other elements not explicitly listed, or elements inherent to such process, method, product, or equipment. Without further limitations, the element defined by the statement "including one . . . " does not exclude the existence of other identical elements in the process, method, product, or device that includes the element in question.

The terms "one embodiment", "some embodiments", "exemplary embodiments", "one or more embodiments", "examples", "one example", "some examples", etc. referred to in this specification are intended to indicate that specific features, structures, materials, or characteristics related to the embodiment or example are included in at least one embodiment or example disclosed herein. The schematic representation of the above terms does not necessarily refer to the same embodiment or example. In addition, the specific features, structures, materials, or characteristics described may be included in any appropriate manner in any one or more embodiments or examples.

In this specification, relational terms such as first and second are only used to distinguish one entity or operation from another, and do not necessarily require or imply any actual relationship or order between these entities or operations.

When describing some embodiments, expressions such as "coupling" and "connection" may be used. For example, in describing some embodiments, the term "connection" may be used to indicate that two or more components have direct physical or electrical contact with each other. For example, in describing some embodiments, the term "coupling" may be used to indicate that two or more components have direct physical or electrical contact. However, the term "coupled" or "communicably coupled" may also refer to two or more components that do not have direct contact with each other but still cooperate or interact with each other. The embodiments disclosed here are not necessarily limited to the content of this specification.

"At least one of A, B, and C" has the same meaning as "at least one of A, B, or C" and includes the following combinations of A, B, and C: only A, only B, only C, a combination of A and B, a combination of A and C, a combination of B and C, and a combination of A, B, and C.

"A and/or B" includes the following three combinations: only A, only B, and a combination of A and B.

As used in this specification, the term "if" is optionally interpreted as meaning "when" or "at" or "in response to a determination" or "in response to a detection" depending on the context. Similarly, depending on the context, the phrases "if determined . . . " or "if [stated condition or event] is detected" can be interpreted as referring to "when determined . . . " or "in response to determining . . . " or "when [stated condition or event] is detected" or "in response to detecting [stated condition or event]".

The use of "for" or "configured as" in this specification implies an open and inclusive language, which does not exclude devices that are applicable or configured to perform additional tasks or steps.

The use of "based on" or "according to" in this specification implies openness and inclusiveness. A process, step, calculation, or other action based on one or more of the conditions or values described, which may be based on other conditions or beyond the values described in practice. The process, steps, calculations, or other actions based on one or more of the stated conditions or values may, in practice, be based on other conditions or beyond the stated values.

As used in this specification, "about", "roughly", or "approximately" include the values described and the average value within an acceptable deviation range of a specific value, where the acceptable deviation range is determined by persons skilled in the art taking into account the measurement being discussed and the errors associated with the measurement of a specific quantity (i.e., limitations of the measurement system).

As used in this specification, "parallelism", "vertical", "equality", and "flush/leveling" include the situations described and situations that are similar to the described situations, and the range of the similar situations is within an acceptable deviation range, where the acceptable deviation range is determined by persons skilled in the art considering the measurement being discussed and the errors associated with the measurement of a specific quantity (i.e., the limitations of the measurement system). For example, "parallelism" includes absolute parallelism and approximate parallelism, where the acceptable deviation range for approximate parallelism can be within 5° of deviation; "vertical" includes absolute vertical and approximate vertical, where the acceptable deviation range for approximate vertical can also be within 5°, for example. "Equality" includes absolute equality and approximate equality, where the acceptable deviation range for approximate equality can be, for example, that the difference between the equal two is less than or equal to 5% of either one. "Leveling" includes absolute leveling and approximate leveling, where the acceptable deviation range for approximate leveling can be, for example, that the distance between the two is less than or equal to 5% of either dimension.

It should be understood that when a layer or component is referred to as being on another layer or substrate, it may be directly on another layer or substrate, or there may be an intermediate layer between the layer or component and another layer or substrate.

This specification describes exemplary embodiments with reference to cross-sectional and/or plan views as idealized illustrative figures. In the attached figure, the thickness of the layers and regions has been enlarged for clarity. Therefore, it can be assumed that there may be changes in the shape relative to the drawings due to factors such as manufacturing technology and/or tolerances. Therefore, the exemplary embodiments should not be interpreted as limited to the shapes of the regions shown in this specification, but rather include shape deviations caused by, for example, manufacturing. For example, etched areas shown as rectangles typically have curved features. Therefore, the areas shown in the figures are essentially illustrative, and their shapes are not intended to show the actual shape of the device's area, nor are they intended to limit the scope of the exemplary embodiments. Unless otherwise specified, the thickness of the film layer refers to the size of the film layer in its normal direction.

Finally, it should be noted that the above embodiments are only used to illustrate the disclosed technical solution and not to limit it. Although the present disclosure has been described in detail with reference to the aforementioned embodiments, those skilled in the art should understand that they can still modify the technical solutions described in the aforementioned embodiments, or equivalently replace some of the technical features. And these modifications or substitutions do not depart from the essence and scope of the corresponding technical solutions disclosed in the present disclosure.

The invention claimed is:

1. A drive circuit, applied to a touch display substrate and a communication coil of the touch display substrate, wherein the drive circuit comprises: a touch display module, connected to the touch display substrate; a communication module, connected to the communication coil, and configured for providing a communication signal to the communication coil during a communication phase; and a processing module, connected to the touch display module and the communication module, and configured for providing a synchronization signal to the touch display module; wherein the touch display module is configured for: according to the synchronization signal, driving the touch display substrate to perform first touch detection and first screen display, wherein a first touch detection phase does not overlap with the communication phase; and wherein the communication phase comprises a monitoring phase, the communication signal comprises a monitoring signal, and the communication module is configured for: providing the monitoring signal to the communication coil during the monitoring phase; the synchronization signal comprises a first synchronization signal, and the first synchronization signal is used for indicating beginning of the monitoring phase; and the touch display module is configured for: after receiving the first synchronization signal for a first duration, driving the touch display substrate to perform the first touch detection and the first screen display, wherein the first duration is a duration of the monitoring phase.

2. The drive circuit according to claim 1, wherein the first touch detection phase, a first screen display phase and the monitoring phase are three different phases located in one frame period.

3. The drive circuit according to claim 2, wherein the first touch detection phase is located between the first screen display phase and the monitoring phase.

4. The drive circuit according to claim 1, wherein the communication phase comprises a reading-writing phase, the communication signal comprises a reading-writing signal, and the communication module is configured for: providing the reading-writing signal to the communication coil during the reading-writing phase;

the synchronization signal comprises a second synchronization signal and a third synchronization signal, the second synchronization signal is used for indicating beginning of the reading-writing phase, the third synchronization signal is used for indicating end of the reading-writing phase, and the processing module is configured for: providing the second synchronization signal and the third synchronization signal to the touch display module in sequence; and the touch display module is configured for: after receiving the second synchronization signal and before receiving the third synchronization signal, driving the touch display substrate to perform the first screen display, and stopping the first touch detection.

5. The drive circuit according to claim 4, wherein the touch display module is further configured for: in N frame periods after receiving the third synchronization signal, driving the touch display substrate to perform the first screen display, and stopping the first touch detection, wherein N is a positive integer.

6. The drive circuit according to claim 5, wherein N is greater than or equal to 1 and less than or equal to 3.

7. The drive circuit according to claim 1, wherein the processing module is further configured for: acquiring power of the monitoring signal; and if the power is greater than or equal to a first threshold, providing the first synchronization signal to the touch display module.

8. The drive circuit according to claim 7, wherein the processing module is further configured for: if the power is less than or equal to a second threshold, providing an indication signal to the touch display module, wherein the second threshold is less than or equal to the first threshold; and the touch display module is further configured for: according to the indication signal, driving the touch display substrate to perform second touch detection and second screen display, wherein a second touch detection phase and/or a second screen display phase overlap with the monitoring phase.

9. The drive circuit according to claim 1, wherein the processing module is connected to the touch display module through a two-wire serial bus or a flexible circuit board.

10. A display device, comprising: the touch display substrate, the communication coil, and the drive circuit according to claim 1, wherein the drive circuit is connected to the touch display substrate and the communication coil, and configured for providing a display signal and a touch signal to the touch display substrate, and providing the communication signal to the communication coil.

11. A touch display substrate, comprising an active area and a non-active area, wherein the active area comprises a communication area and a non-communication area, and the touch display substrate comprises: a touch electrode, located in the active area, and configured for transmitting a touch signal during a touch detection phase; a valid communication line, located in the communication area, and configured for transmitting a communication signal during a communication phase; a virtual communication line, located in the non-communication area, and configured for transmitting the touch signal during the touch detection phase; a plurality of scanning signal lines, located in the active area; and a gate drive circuit, located in the non-active area, wherein the gate drive circuit comprises a plurality of shift registers cascaded with each other, output terminals of the plurality of shift registers are connected to the plurality of scanning signal lines, and each of the plurality of shift registers comprises a signal generation circuit and a filter circuit connected to an output terminal of the signal generation circuit, the signal generation circuit is configured for generating a scanning signal, and the filter circuit is configured for filtering out a high-frequency harmonic in the scanning signal, wherein a frequency of the high-frequency harmonic comprises a frequency of a subcarrier in the communication signal; and wherein the communication phase comprises a monitoring phase, the communication signal comprises a monitoring signal, and a communication module is configured for: providing the monitoring signal to a communication coil during the monitoring phase; the synchronization signal comprises a first synchronization signal, and the first synchronization signal is used for indicating beginning of the monitoring phase; and the touch display is configured for: after receiving the first synchronization signal for a first duration, driving the touch display substrate to perform the first touch detection and the first screen display, wherein the first duration is a duration of the monitoring phase.

12. The touch display substrate according to claim 11, wherein the touch display substrate further comprises:

a common signal line, located in the non-active area, connected to the virtual communication line, and configured for providing the touch signal to the virtual communication line during the touch detection phase.

13. The touch display substrate according to claim 11, wherein the touch display substrate further comprises:

a connecting line, connected between the touch electrode and the virtual communication line, and configured for transmitting a signal of the touch electrode to the virtual communication line.

14. The touch display substrate according to claim 11, wherein the filter circuit comprises a RC filter circuit.

15. A display device, comprising:

the touch display substrate according to claim 11; and a drive circuit, connected to the touch display substrate, and configured for providing a display signal, the communication signal and the touch signal to the touch display substrate.

16. A driving method of a touch display substrate, wherein the touch display substrate comprises a plurality of sub-pixels arranged in array, the touch display substrate supports a first frame frequency and a second frame frequency, the second frame frequency is greater than the first frame frequency, a period corresponding to the first frame frequency is a first frame period, and in one first frame period, the driving method comprises: in a screen refresh phase, charging rows of sub-pixels in the touch display substrate row by row, and a charging duration for each row of sub-pixels is a charging duration for each row of sub-pixels at the second frame frequency; in a screen holding phase, driving the touch display substrate to perform touch detection; and a communication phase comprising a monitoring phase, a communication signal comprises a monitoring signal, and a communication module is configured for: providing the monitoring signal to a communication coil during the monitoring phase; a synchronization signal comprises a first synchronization signal, and the first synchronization signal is used for indicating beginning of the monitoring phase; and the touch display is configured for: after receiving the first synchronization signal for a first duration, driving the touch display substrate to perform the first touch detection and the first screen display, wherein the first duration is a duration of the monitoring phase.

17. The driving method according to claim 16, wherein a ratio of a duration of the screen holding phase to the first frame period is greater than or equal to 0.3 and less than or equal to 0.5.

18. The driving method according to claim 16, wherein a communication coil of the touch display substrate is used for transmitting a communication signal, and the step of charging rows of sub-pixels in the touch display substrate row by row comprises:

in response to triggering of a plurality of effective pulses in a clock signal, charging the rows of sub-pixels in the touch display substrate row by row, wherein the clock signal is a periodic pulse signal, a frequency of the periodic pulse signal is a pulse frequency, and even multiples of the pulse frequency are different from a frequency of the communication signal.

19. The driving method according to claim 18, wherein the pulse frequency is greater than or equal to 10 KHz, and less than or equal to 12 KHz; and/or a frequency of a subcarrier in the communication signal is greater than or equal to 800 KHz.

* * * * *